US012162728B2

(12) United States Patent
Bütler et al.

(10) Patent No.: US 12,162,728 B2
(45) Date of Patent: Dec. 10, 2024

(54) ELEVATOR RAIL

(71) Applicant: Inventio AG, Hergiswil (CH)

(72) Inventors: Erich Bütler, Ebikon (CH); Paolo Ferrario, Thalwil (CH); Peter Möri, Rothenburg (CH); Romeo Lo Jacono, Gravesano (CH)

(73) Assignee: INVENTIO AG, Hergiswil (CH)

( * ) Notice: Subject to any disclaimer, the term of this patent is extended or adjusted under 35 U.S.C. 154(b) by 523 days.

(21) Appl. No.: 17/309,504

(22) PCT Filed: Dec. 19, 2019

(86) PCT No.: PCT/EP2019/086382
§ 371 (c)(1),
(2) Date: Jan. 24, 2022

(87) PCT Pub. No.: WO2020/127787
PCT Pub. Date: Jun. 25, 2020

(65) Prior Publication Data

US 2023/0286780 A1 Sep. 14, 2023

(30) Foreign Application Priority Data

Dec. 20, 2018 (EP) .................................... 18214771

(51) Int. Cl.
*B66B 7/02* (2006.01)
*B66B 9/00* (2006.01)

(52) U.S. Cl.
CPC .............. *B66B 7/022* (2013.01); *B66B 7/024* (2013.01); *B66B 9/00* (2013.01)

(58) Field of Classification Search
CPC ........... B66B 7/022; B66B 7/024; B66B 9/00; B66B 7/02
See application file for complete search history.

(56) References Cited

U.S. PATENT DOCUMENTS 3,211,259 A * 10/1965 Tofanelli ................. B66B 7/022 187/408
5,131,505 A * 7/1992 Isenmann ............... B66B 7/024 187/408

(Continued)

FOREIGN PATENT DOCUMENTS

CN 203199852 U 9/2013
CN 204198175 U 3/2015

(Continued)

*Primary Examiner* — Michael R Mansen
*Assistant Examiner* — Michelle M Mudwilder
(74) *Attorney, Agent, or Firm* — William J. Clemens; Shumaker, Loop & Kendrick, LLP

(57) ABSTRACT

An elevator rail guides moving bodies of an elevator system. The moving bodies serve in particular as a car for the transport of people or goods or as a counterweight. The elevator rail has more than one guide contour including a guide contour 6 that interacts with a guide shoe such that in a first horizontal direction, a relative horizontal movement between the guide contour and the guide shoe is delimited at least on one side, and such that in a second horizontal direction, perpendicular to the first horizontal direction, a relative horizontal movement between guide contour and the guide shoe is delimited on both sides. The elevator rail has a hollow cross section bordered in a closed manner. The elevator rail has at least three of the guide contours that are formed on the outer surface of the elevator rail.

19 Claims, 4 Drawing Sheets

(56) References Cited

U.S. PATENT DOCUMENTS

| | | | | | |
|---|---|---|---|---|---|
| 5,469,938 | A * | 11/1995 | Biewald | B66B 7/022 52/506.03 |
| 5,520,264 | A * | 5/1996 | Korhonen | B66B 7/024 187/408 |
| 5,725,074 | A * | 3/1998 | Richter | B66B 7/022 52/745.17 |
| 6,012,554 | A * | 1/2000 | Ito | B66B 7/022 187/406 |
| 6,035,974 | A * | 3/2000 | Richter | B66B 7/022 187/404 |
| 6,481,538 | B2 * | 11/2002 | Blackaby | B66B 7/02 187/254 |
| 7,147,086 | B2 * | 12/2006 | Ach | B66B 7/024 187/408 |
| 9,469,505 | B2 * | 10/2016 | Piech | B66B 7/022 |
| 9,546,076 | B2 * | 1/2017 | Mikkonen | B66B 7/022 |
| 10,017,356 | B2 | 7/2018 | Hubbard | |
| 2006/0042879 | A1 * | 3/2006 | Tepecik | B66B 7/022 187/250 |
| 2007/0119331 | A1 | 5/2007 | Korchagin et al. | |
| 2008/0053756 | A1 * | 3/2008 | Gremaud | B66B 7/02 187/401 |
| 2015/0307320 | A1 * | 10/2015 | Hubbard | B66B 7/022 156/196 |

FOREIGN PATENT DOCUMENTS

| | | | |
|---|---|---|---|
| DE | 4423412 | A1 | 4/1996 |
| DE | 20105144 | U1 | 7/2001 |
| EP | 0774439 | A1 | 5/1997 |
| EP | 0745550 | B1 | 2/2002 |
| EP | 2918537 | A1 | 9/2015 |
| EP | 3103753 | A1 | 12/2016 |
| FR | 2527535 | A1 | 12/1983 |
| GB | 919163 | A | 2/1963 |
| RU | 2091290 | C1 | 9/1997 |
| WO | 0222485 | A1 | 3/2002 |
| WO | 2007012336 | A1 | 2/2007 |
| WO | WO-2019059840 | A1 * | 3/2019 |

* cited by examiner

ELEVATOR RAIL

FIELD

The present invention relates to an elevator rail having more than one guide contour. The invention also relates to a guide system and an elevator system which have such elevator rails.

BACKGROUND

In an elevator system, a moving body, i.e., an elevator car or a counterweight, is typically displaced vertically along a travel path between different floors or levels within a structure. Typically, each moving body is guided by two elevator rails which are often attached independently of one another to different shaft walls. At least in tall buildings, an elevator type is usually used in which the elevator car is held by rope or belt-like suspension elements and displaced within an elevator shaft by moving the suspension elements by means of a drive machine. In order to at least partially compensate for the load of the elevator car to be moved by the drive machine, a counterweight is usually attached to an opposite end of the suspension elements. This counterweight has at least the same mass as the elevator car. As a rule, the mass of the counterweight exceeds that of the elevator car by half of the payload to be transported permissibly by the elevator car. Depending on the type of elevator, a plurality of counterweights and/or a plurality of elevator cars can also be provided in an elevator system.

DE20105144 U1 shows an elevator system which guides two counterweights inside two hollow elevator rails.

EP3103753 A1 shows an elevator rail system which is formed from sheet metal and, as a functional combination in the same component, contains guide contours for the counterweight and the car.

SUMMARY

Among other things, there can be a need for a guide system, an elevator rail and/or an elevator system in which a base surface and/or a space requirement for the elevator system is low and in which the total costs for the elevator system can nevertheless be kept low. Furthermore, there can be a need for a counterweight and an elevator system equipped with said counterweight, in which a number of elevator components used to hold and guide the counterweight can be kept small and thus an installation effort and costs can be reduced. Furthermore, there can be a need for an elevator system that places low demands on the precision of the on-site building interfaces, in particular the flatness of shaft walls.

At least one of the demands mentioned can be met with the subject matter according to any of the advantageous embodiments defined in the following description.

According to a first aspect of the invention, the elevator rail according to the invention is used to guide the moving bodies of an elevator system. The moving bodies serve as a car for the transport of people or goods or as a counterweight. The elevator rail has more than one guide contour. The guide contour is suitable for interacting with a guide shoe such that in a first horizontal direction, a relative horizontal movement between the guide contour and the guide shoe is delimited at least on one side, and that in a second horizontal direction, perpendicular to the first horizontal direction, a relative horizontal movement between the guide contour and guide shoe is delimited on both sides. The elevator rail has a hollow cross section bordered in a closed manner. The elevator rail has at least three guide contours, wherein the guide contours are formed on the outer surface of the elevator rail.

According to a second aspect of the invention, a guide system according to the invention comprises a first and a second of the above-described elevator rails.

According to a third aspect of the invention, an elevator system with the above-described guide system has two counterweights and a car, wherein each of the elevator rails guides one counterweight by itself.

Possible features and advantages of embodiments of the invention can be considered, among other things and without limiting the invention, to be dependent upon the concepts and findings described below.

The guide contour of an elevator rail is the interaction surface between the elevator rail and a guide shoe. In a conventional elevator rail, for example, a T89, the guide contour corresponds to the three smoothed surfaces on the elevator rail head. These three surfaces are at right angles to one another and each serves as a running surface for a contact surface or a roller of a guide shoe. In this case, the end face of the elevator rail can delimit the movement of the guide shoe perpendicular to the end face of the guide shoe only on one side, whereas the two side surfaces delimit the movement of the guide shoe perpendicular to the side surfaces on both sides.

A guide contour is usually designed in the form of a tongue. For this purpose, the tongue is usually designed to be rectangular; it protrudes from a load-bearing element, in particular a rail foot, such that it can be encompassed by a guide shoe. Completely different guide contours are also known, in particular round and triangular guide contours.

As already indicated above, conventional elevator rails each have only one guide contour. Elevator systems using such elevator rails therefore normally have two elevator rails per moving body because the design should not only delimit the movement in all horizontal directions but also a rotation about the vertical axis. For a typical elevator with a counterweight, four elevator rails are therefore necessary.

The advantage of the proposed elevator system is that an elevator rail has at least three guide contours. As a result, the number of elevator rails required can be kept small. This not only saves material of an elevator rail as such; the saving effect also means that fewer elevator rail holders are installed because fewer elevator rails are to be held. The installation effort is also reduced. Advantageously, only two elevator rails are required to guide three moving bodies, i.e., a car and two counterweights.

An elevator rail with a cross section bordered in a closed manner has an empty region in the interior, while the material is concentrated in an edge region. Individual holes in the elevator rail, for example, for realizing screw connections, do not contradict the property of the cross section bordered in a closed manner. A slot over the entire length of the elevator rail would no longer be compatible with the cross section bordered in a closed manner. An elevator rail bordered in a closed manner can also be called a hollow elevator rail. In this case, the interior of the elevator rail does not necessarily have to be empty or only filled with air. The elevator rail can also be filled. Foamed polymers, sand or concrete are particularly suitable for this purpose.

The design of the elevator rail with a cross section bordered in a closed manner is advantageous because, with the same material input, it is significantly sturdier than an open cross section. There are methods for producing such an elevator rail, for example, extrusion molding or the assembly of a plurality of parts.

It would also be possible to guide a counterweight inside a hollow elevator rail. However, for this purpose, the counterweight would have to be extremely tall, or the elevator rail would have to have a very large internal cross section. It is therefore advantageous if the guide contour is realized on the outer surface of the hollow elevator rail.

In the following, further embodiments of the invention will be described.

According to one embodiment of the elevator rail, at least one of the guide contours is designed as a groove which is used to guide a guide shoe.

This feature can be regarded as an independent invention. Independently, an elevator rail for guiding moving bodies of an elevator is thus disclosed, wherein the moving bodies are used to transport people or goods or as a counterweight. For this purpose, the elevator rail has at least one guide contour which is designed as a groove and used to guide a guide shoe.

The groove is characterized in that the outer surface of the elevator rail has an indentation at the location of the guide contour, the interior of said indentation being used to accommodate a guide shoe.

It is advantageous to design a guide contour as a groove into which a guide shoe protrudes. In this case, the groove can be designed to be rectangular, so that a guide shoe can be guided inside the groove. The rectangular groove can also delimit the movement of the guide shoe perpendicular to the central surface of the guide shoe on only one side, while the two side surfaces delimit the movement of the guide shoe perpendicular to the side surfaces on both sides.

The advantage of a groove, in particular when it concerns the car guide, is that a large part of the guide shoe runs in the groove, leaving more space for the car next to the elevator rail. It can be assumed that the elevator rail must have a specific base surface in order to be able to absorb the necessary forces. The car wall and, behind it, the usable space in the car could run directly adjacent thereto. If the guide contour were to extend out of the elevator rail in the direction of the car, it would result in a decrease in size of the car because the guide contour would otherwise extend into the car. However, with such a guide contour, the guide shoe also extends around the guide contour, further reducing the region usable for the car. However, if the guide contour extends into the elevator rail, i.e., away from the car, space is freed up that can be taken up by the guide shoe, and the entire space is available for the car.

Advantageously, the groove also has larger contact surfaces, which has a positive effect on abrasion, in particular from sliding shoes. In particular, the bottom or the central part of the groove can be much wider than is usual for the end face of a classic elevator rail such as the T89.

According to one embodiment of the elevator rail, the guide contour is designed as a groove and to be essentially rectangular.

The rectangular shape has the advantage that the guiding behavior is comparable to that of a classic elevator rail. Shapes other than an essentially rectangular shape could cause other forces to occur. If the guide contour were triangular, for example, pressing a triangular guide shoe into the triangular groove would greatly increase the normal forces and thus the frictional forces.

According to one embodiment of the elevator rail, the elevator rail is essentially triangular, in particular it is essentially right-angled triangular.

The triangular shape allows for a better utilization of the narrow space in the elevator system. As a result, more space can ultimately be made available in the car for the transport of people and goods.

The advantage of a right-angled triangular arrangement is that the two legs, which are at right angles to one another, can be aligned according to the axes of the elevator. A first of the two legs can thus be aligned parallel to a shaft wall, for example, the front wall. A connection from the shaft wall to the first leg can now be realized using a simple bracket. The second of the two legs is thus aligned parallel to a car wall. It is therefore not necessary to create an oblique-angled connection in order to form a guide contour on the second leg for guiding the car.

According to one embodiment of the elevator rail, the guide contour is designed as the or a groove, and at least two further guide contours are designed as tongues, wherein the two guide contours designed as tongues lie at corner points of the essentially triangular elevator rail that are furthest apart from one another.

The longest of the three sides of the essentially triangular elevator rail is advantageously used such that one guide contour for guiding the counterweight is attached to each of the two ends of said longest side. As a result, the distance is relatively large and the counterweight is also sufficiently guided around its vertical axis of rotation. The closer the two guide contours for guiding the counterweight are to one another, the worse the counterweight is held in the required alignment around the vertical axis. This reliably prevents the car or the shaft walls from being touched by the more distal ends of the counterweight.

Since these two contours are designed as tongues at the ends of the longest edge, the two points of force transmission of the guide forces at the tongues are advantageously separated even further from one another. As a result, the guiding of the counterweight around the vertical axis becomes even more stable.

The guide contour designed as a groove lies advantageously on a leg of the essentially right-angled triangular cross section and is used to guide the car or the car guide shoe.

According to one embodiment of the elevator rail, a braking contour is configured which is separate from the guide contours and which serves as a braking surface for a safety brake.

The braking contour is characterized in that a safety device can act on the braking contour, thus bringing in particular the car safely to a halt. The braking contour is advantageously designed as a tongue, so that a safety brake can be used which, according to the conventional principle, compresses the tongue, i.e., the brake rod, in order to generate the corresponding frictional forces. The pressure forces that are introduced into the elevator rail as a result of the action of the brake linings merely press the braking contour closer together. However, the elevator rail will essentially not be deformed in the process.

Nevertheless, the braking contour can alternatively also be designed as a braking contour groove, in which case the safety brake is braced against the outside in the braking contour groove in order to generate the corresponding frictional forces. In this case, the elevator rail is designed to be so sturdy that the profile can withstand the pressure forces.

A further advantage of the braking contour is that the safety devices do not act on the elevator rails where the guide shoes are guided. Any small damage to the braking contour due to previous braking actions has no negative effect on the riding comfort.

According to one embodiment of the elevator rail, the elevator rail has a bracket fastening contour which allows for a bracket to be attached in a vertically movable manner.

Advantageously, the bracket is attached to the bracket fastening contour such that it can be moved upwards and/or downwards in the bracket fastening contour. This allows for the problem of building subsidence to be taken into account. If the building is still subsiding after the elevator has been installed, the bracket that aligns the elevator rail can be moved downwards along the bracket fastening contour without applying a moment to the elevator rail or the bracket being bent.

According to one embodiment of the elevator rail, the elevator rail comprises at least one shaped sheet metal.

The use of sheet metal has the advantage that the elevator rail can be manufactured inexpensively and at a high quality. In comparison to a solid rail, there is also a weight saving which simplifies the transport and installation of the elevator rails.

The elevator rails are manufactured using generally known techniques for manufacturing rolled sheet metal profiles. A cross section bordered in a closed manner is achieved by closing the elevator rail. In particular, the joint can be welded to close the cross section, or it is folded over and spot-welded, crimped or closed using a similar method.

According to one embodiment of the guide system, the guide system has a plurality of brackets which are each fastened to an elevator rail, and the brackets connect an elevator rail directly or indirectly to a shaft wall.

The advantage of the brackets is that they can be designed in a simple manner. The space can be used optimally.

According to one embodiment of the guide system, the brackets are connected to the same one shaft wall, wherein the shaft wall is in particular the front wall in which the floor openings are integrated.

This has the advantage that only one of the four shaft walls meets the relatively precise geometry and construction requirements for elevator construction. The structural precision of the other shaft walls can be lower. There is also the advantage that it is sufficient that the material of the front wall with the floor openings meets the requirements of elevator construction with regard to force transmission in order to attach an elevator to it. All other shaft walls can be made from materials that are unsuitable for fastening an elevator system, in particular also from significantly weaker materials.

According to one embodiment of the guide system, the two elevator rails are connected at least at one height in the shaft via a clamp bracket, wherein one clamp bracket has a bracket of the first elevator rail, a bracket of the second elevator rail and a connecting part that connects the two brackets.

For this purpose, the two brackets and the connecting part can be firmly and inseparably connected to one another, i.e., formed from one component, or they can be individual components that can be joined, for example, via releasable screw connections.

The advantage of such a clamp bracket is that the distance between the two elevator rails is predetermined by the connecting part. The track width for the car, i.e., the distance between the two guide contours used to guide the car, is thus fixed. A separate setting of the distance is therefore largely unnecessary.

In addition, only one clamp bracket per fastening level needs to be aligned and fastened during installation. Without the connecting part, two individual brackets would have to be aligned and fastened separately. With the use of the clamp bracket, the installation effort can thus be almost halved.

According to one embodiment of the guide system, the clamp bracket is attached to a single shaft wall, in particular to the front wall.

The clamp bracket can be connected to the shaft wall, in particular the front wall, via the connecting part. The brackets are then indirectly connected to the shaft wall. There are the same advantages as in the above embodiment with the brackets connected to the same one shaft wall.

According to one embodiment of the elevator system, both the two elevator rails each guide an associated counterweight via two guide contours and the two elevator rails jointly guide the car via a third guide contour.

This has the advantage that it is sufficient to mount only two instead of four or even six elevator rails. This is advantageous because by using two counterweights, the base surface of the shaft can be optimally utilized.

Further advantages, features and details of the invention will become apparent from the following description of embodiments and from the drawings, in which identical or functionally identical elements are denoted with identical reference signs. The drawings are merely schematic and not to scale.

DETAILED DESCRIPTION

Figure 1:
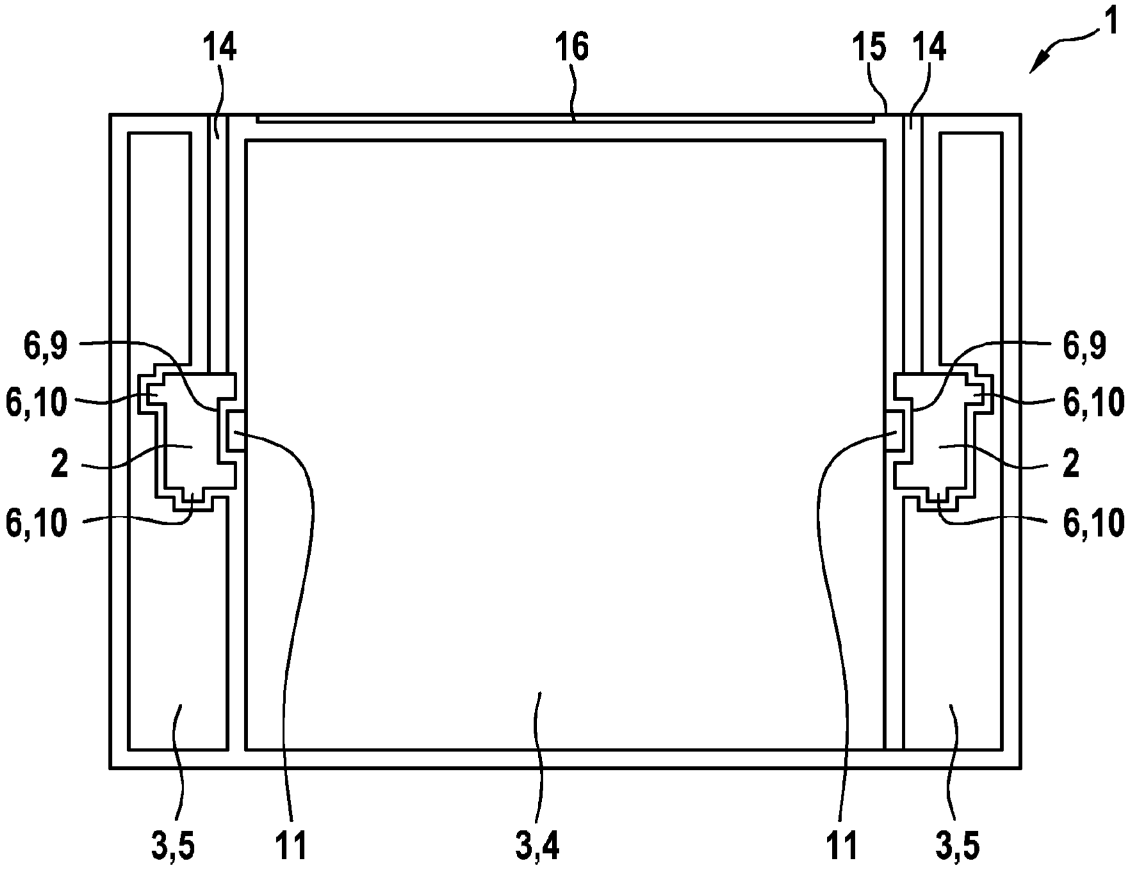
FIG. 1 shows a cross section of an elevator system with an embodiment of the elevator rail.

FIG. 1 shows an elevator shaft of an elevator system 1. The elevator system 1 comprises three moving bodies 3, i.e., a car 4 and two counterweights 5, and two elevator rails 2. Each of the elevator rails 2 has at least three guide contours 6. The car 4 is guided by a respective guide contour 6, in this case a groove 9, of the two elevator rails 2. The car 4 has guide shoes 11 which engage in the groove 9 of the elevator rail 2. Each single elevator rail 2 is held in the elevator shaft in that it is connected to the front wall 15 of the elevator shaft via brackets 14. The front wall 15 is characterized in that the landing doors are located in this wall. As a result, the door sills 16 are also attached to this front wall 15.

One counterweight 5 each is guided on a respective elevator rail 2. In order to ensure that the counterweight 5 moves neither horizontally nor rotates about the vertical axis, each individual counterweight 5 is guided on two guide contours 6 of the elevator rail 2. The further these two guide contours 6 are spaced apart from one another, the more effectively a twisting of the counterweight 5 can be prevented. In this example, the two guide contours 6 which each hold a counterweight 5 are designed as tongues 10. As a result, a distance between the two guide contours 6 of a counterweight is additionally increased.

The elevator rail 2 itself is formed, for example, from sheet metal. The counterweights 5 are optimally shaped such that they optimally fill the remaining space next to the car.

Figure 2:
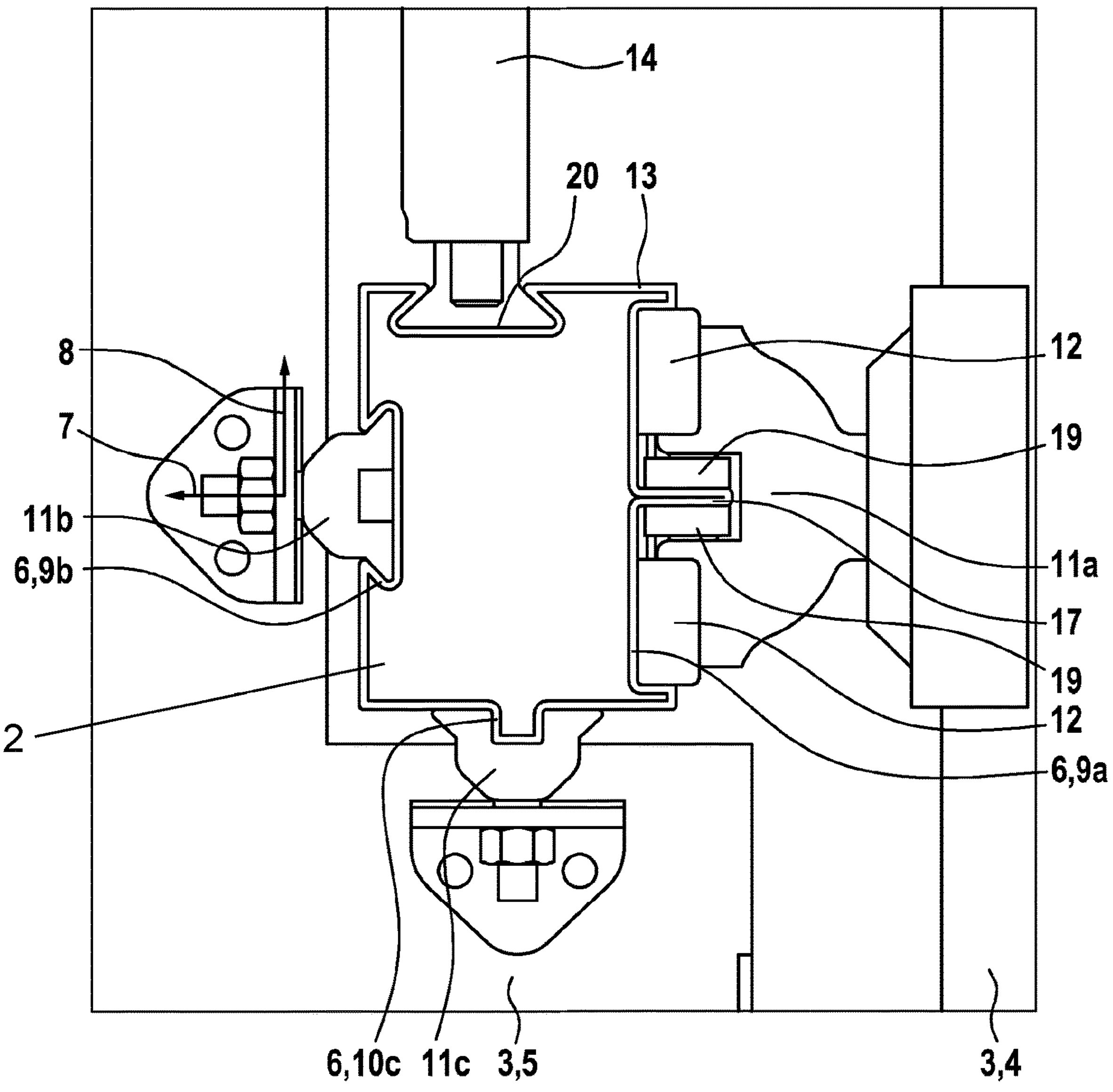
FIG. 2 is a detailed view of a cross section of an alternative elevator rail in an elevator system.

FIG. 2 is a more detailed view of an elevator rail 2 which could be used in an elevator system 1 similar to that of FIG. 1.

The elevator rail 2 or at least parts of the elevator rail consist of sheet metal 13 which is preferably brought into the shape of the elevator rail 2 or the parts thereof by a rolling process. In FIG. 2, the elevator rail 2 is designed to be essentially rectangular. In this view, the elevator rail 2 on the upper flank of the rectangle is designed such that it can be connected to the bracket 14. The contour shown in FIG. 2 allows the bracket 14 to be moved along its longitudinal direction relative to the elevator rail 2. If the building still subsides in the first few months after construction, the brackets 14 can slide along the elevator rail 2 without the elevator rail 2 being damaged or deformed in the process.

In this view, the elevator rail 2 on the right-hand flank of the rectangle is designed such that it serves as a guide for the car 4. The guide contour 6 is essentially designed as a rectangular groove 9*a*. The two sliding linings 12 of the guide shoe 11*a* are guided in the corners of the groove 9*a*. In addition to the groove 9*a*, a braking contour 17 is also arranged inside the guide contour 6. In this case, the term “groove” is supposed to refer to the U-shaped groove 9*a* which actually has a continuous bottom and is supplemented by the braking contour 17 which protrudes from said continuous bottom. Since the safety brake 19 is pressed against the braking contour 17 during safety braking, the surface of the braking contour 17 can be damaged in the process. The sliding linings 12 do not touch the braking contour 17 when sliding. Therefore, the damage that occurs to the braking contour 17 during safety braking does not have any influence on the quality of the ride.

In this view, the elevator rail 2 on the left and lower flank of the rectangle is designed such that it forms one guide contour 6 each. These two guide contours 6 are used to guide a counterweight 5. In this case, the guide contour on the left flank is designed as a groove 9*b*. Since this groove 9*b* has an undercut, the groove 9*b* can guide the guide shoe 11*b* not only in a second horizontal direction 8 on both sides, but also in the first horizontal direction 7. This has the advantage that the counterweight 5 is thus guided more securely. However, the introduction of the guide shoe 11*b* into the elevator rail requires specific measures. For this purpose, a guide shoe 11*b* is designed, for example, such that it only reaches its full width in the groove 9*b*. For example, a two-part guide shoe 11*b* can be inserted in individual parts and is then assembled in the groove 9*b*, so that its shape adapts to the shape of the rail. Alternatively, the guide shoe 11*b* can be designed such that it has a flattened shape that fits through the narrow passage of the groove 9*b* and by twisting it, the guide shoe 11*b* reaches the full width of the rail. However, alternatively, it is also possible to design the elevator rail 2 at specific installation and removal points for the counterweights 5 such that the guide shoe 11*b* can be extended and retracted at such a point.

The lower flank of the rectangle contains the second guide contour 6 which guides the counterweight 5 on this side of the car 4. In this example, said guide contour is designed as a tongue 10*c*. The guide shoe 11*c* is designed as a sliding guide shoe.

In this view, the elevator rail 2 on the upper flank of the rectangle is designed such that it forms a bracket fastening contour 20. The bracket fastening contour 20 shown in FIG. 2 allows the bracket 14 to jam in this bracket fastening contour 20. By optimally selecting the clamping force, a movement within the bracket fastening contour 20 is possible if this were to become necessary due to a subsiding of the building.

Figure 3:
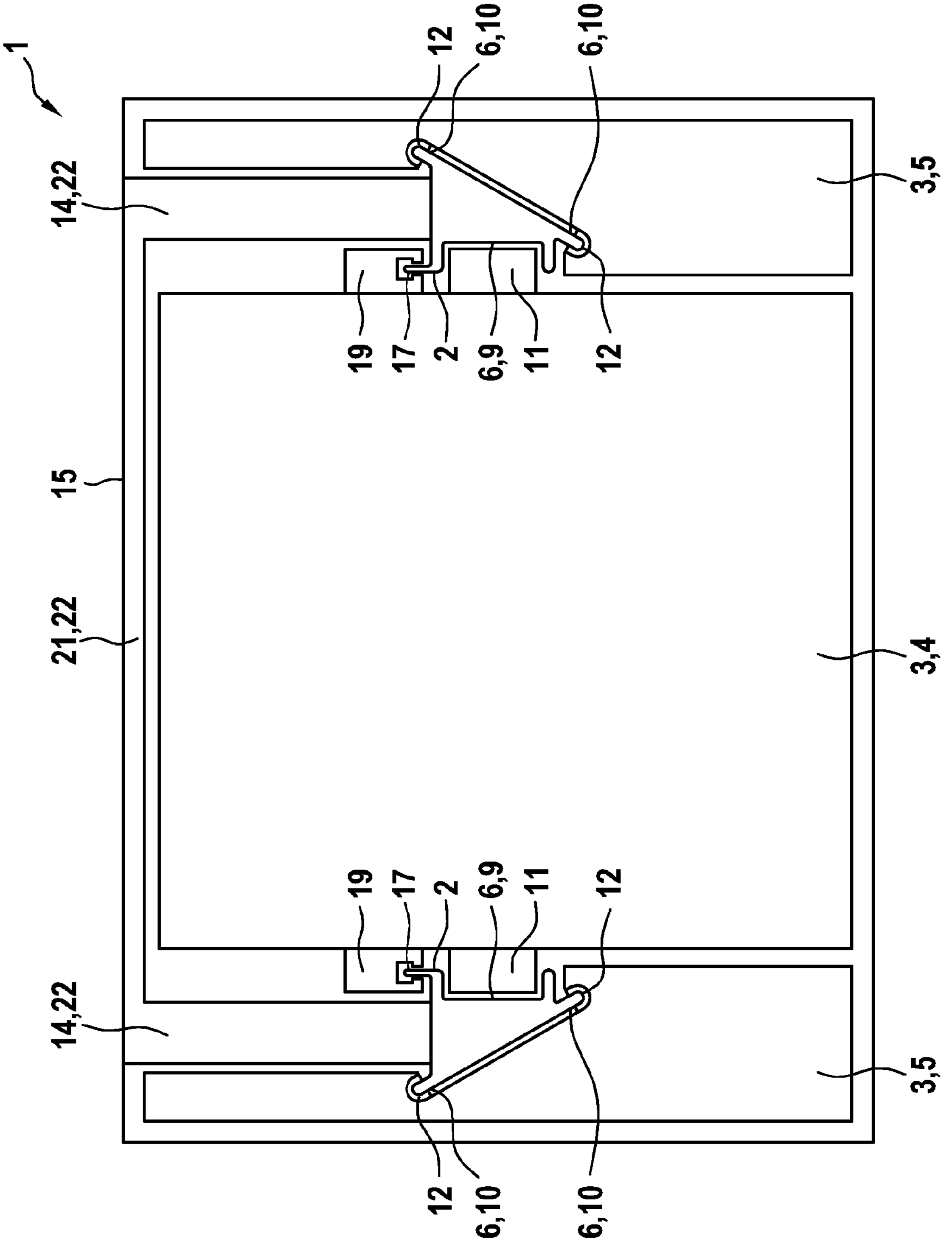
FIG. 3 shows a cross section of a further alternative embodiment of the elevator rail in the elevator system.

FIG. 3 shows a further possible embodiment of an elevator system 1 and a guide system. In this case, the elevator rail 2 is shown as being essentially triangular. The elevator rail is connected to the front wall 15 of the building via brackets 14. In this case, it is a clamp bracket 22 in which the two brackets 14 are connected along the front wall 15 to a connecting part 21.

The counterweight 5, which is held by this one elevator rail 2, is guided via two tongues 10. In order to keep the friction low, sliding linings 12 are attached to the counterweight 5.

The car 4 is guided via one guide shoe 11 each. The guide shoe can be designed as a sliding guide shoe or as a roller guide shoe. When designed as a roller guide shoe, the rollers can be arranged such that one roller assumes the function of the one-sided stop at the bottom of the groove 9, and a second roller assumes the function of the two-sided stop at the side surfaces of the groove 9. As a result, the roller that realizes the two-sided stop rotates in one or the other direction, depending on where a load is located in the car 4. Even during a ride, a movement of the load in the car 4 can lead to the roller losing contact with one side surface and touching the other side surface, thereby changing the direction of rotation. However, three or more rollers can also be used, so that a separate roller is available for both side surfaces of the groove 9 and at least one roller is available for rolling on the bottom of the groove 9.

The car 4 has safety brakes 19. The safety brakes 19 are optimally attached next to the car 4. This embodiment is also advantageous because the car 4 is not braked on a surface used for guiding; instead, a braking contour 17 is used exclusively for the braking by the safety brake 19.

Figure 4:
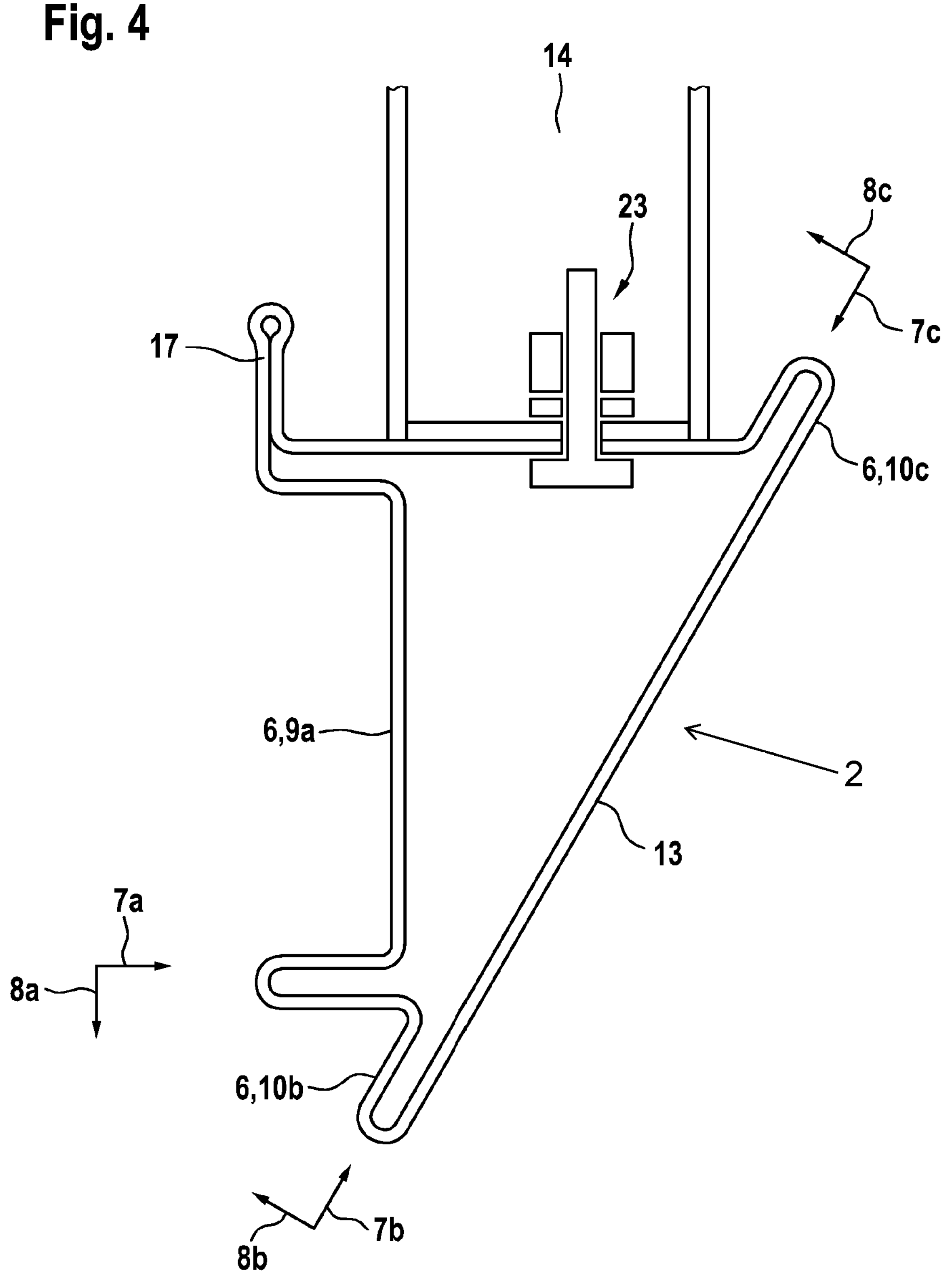
FIG. 4 is a detailed view of a cross section of the further alternative elevator rail according to FIG. 3 in isolation.

FIG. 4 is a detailed view of the cross section of an elevator rail 2 as used in the embodiment shown in FIG. 3. The elevator rail 2 is advantageously rolled from sheet metal and joint-welded at a suitable point. The guide contour 6 for the car is located on the left-hand side. It is designed as a groove 9*a*. A guide shoe attached to the car can engage in this groove 9*a*. In this case, a one-sided delimitation of the movement is ensured in the first horizontal direction 7*a*. The guide shoe of the car 4 can only be moved to the right in the first horizontal direction 7*a* until it bears against the bottom of the groove 9*a*. In the second horizontal direction 8*a*, a two-sided delimitation of the movement is ensured. The guide shoe of the car can only be moved in the second horizontal direction 8*a* until it bears against the side surfaces of the groove 9*a*. Of course, there can be some play but the movement is nevertheless delimited.

One of the two guide contours 6 of the counterweight is located at the bottom of FIG. 4. This guide contour 6 is designed as a tongue 10*b*. A guide shoe attached to the counterweight can encompass this tongue 10*b*. In this case, a one-sided delimitation of the movement is ensured in a first horizontal direction 7*b*. The guide shoe of the car can only be moved in the first horizontal direction 7*b* until the tongue 10*b* bears against the bottom of the guide shoe. In a second horizontal direction 8*b*, a two-sided delimitation of the movement is ensured. The guide shoe of the car can only be moved in the second horizontal direction 8*b* until it bears against the side surfaces of the tongue 10*b*. Of course, there can be some play, but the movement is nevertheless delimited.

The tongue 10c for the second guide shoe of the counterweight is located at the top right of the figure. As for 10b, it is also a tongue. With regard to the first horizontal direction 7c and the second horizontal direction 8c, the same applies as for 7b and 8b.

The braking contour 17 is located at the top left. In this case, it is aligned parallel to the side wall of the car, so that the safety brake can be better accommodated in the tight spaces between the car and the bracket 14.

The bracket 14 is fastened to the elevator rail 2 between the braking contour 17 and the tongue 10c. In this case, the bracket 14 is fastened to the elevator rail 2 by means of a screw connection 23.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator rail for guiding moving bodies of an elevator system along a travel path between different floors or levels of a structure, wherein the moving bodies serve as a car for the transport of people or goods or as a counterweight, the elevator rail comprising:

a rail having a hollow cross section bordered in a closed manner by a continuous outer surface, the continuous outer surface extending all along the travel path when the rail is installed in the elevator system;

at least three guide contours formed on the continuous outer surface of the rail, where the guide contours each guide an element associated with one of the moving bodies;

wherein a first of the at least three guide contours is a groove formed in the continuous outer surface and indented toward an interior of the hollow cross section, where the groove is adapted to interact with a guide shoe associated with the moving bodies such that in a first horizontal direction, a relative horizontal movement between the groove and the guide shoe is delimited at least on one side of the guide shoe, and that in a second horizontal direction, perpendicular to the first horizontal direction, a relative horizontal movement between groove and the guide shoe is delimited on two other sides of the guide shoe; and wherein a second of the at least three guide contours is formed as a tongue.

2. The elevator rail according to claim 1 wherein the groove is rectangular in cross section.

3. The elevator rail according to claim 1 wherein the rail is triangular in cross section.

4. The elevator rail according to claim 3 wherein the rail is right-angled triangular in cross section.

5. The elevator rail according to claim 3 including a third of the at least three guide contours being formed as a tongue, and wherein the second guide contour and the third guide contour lie at corner points of the triangular rail that are furthest apart from one another.

6. The elevator rail according to claim 1 including a braking contour formed on the outer surface of the rail separate from the at least three guide contours, the braking contour providing a braking surface for a safety brake associated with the moving bodies.

7. The elevator rail according to claim 1 wherein the rail includes a bracket fastening contour adapted for attaching a bracket for relative vertical movement between the rail and the bracket.

8. The elevator rail according to claim 1 wherein the rail is formed from at least one shaped sheet metal.

9. A guide system comprising two of the elevator rail according to claim 1 adapted to guide at least two moving bodies in an elevator system.

10. The guide system according to claim 9 including a plurality of brackets, each of the brackets being fastened to at least one of the elevator rails and being adapted to connect the elevator rails directly or indirectly to a shaft wall of the elevator system.

11. The guide system according to claim 10 wherein the brackets are adapted to be connected to the shaft wall that is a front wall in which floor openings are integrated.

12. The guide system according to claim 10 wherein the elevator rails are connected at least at one height on the shaft wall by a clamp bracket, the clamp bracket including a first one of the brackets fastened to one of elevator rails, a second one of the brackets fastened to another of the elevator rails, and a connecting part connecting the first bracket to the second bracket.

13. The guide system according to claim 12 wherein the clamp bracket is attached to a single shaft wall of the elevator system.

14. The guide system according to claim 13 wherein the single shaft wall is a front wall of the elevator system.

15. An elevator system comprising:

a guide system according to claim 9;

two counterweights;

a car; and wherein each of the elevator rails guides an associated one of the counterweights.

16. The elevator system according to claim 15 wherein the two elevator rails each guide the associated counterweight by the second guide contour and a third guide contour of the at least three guide contours, and wherein the two elevator rails jointly guide the car by the first guide contours.

17. An elevator rail for guiding moving bodies of an elevator system, wherein the moving bodies serve as a car for the transport of people or goods or as a counterweight, the elevator rail comprising:

a rail having a hollow cross section bordered in a closed manner by a continuous outer surface;

at least three guide contours formed on the continuous outer surface of the rail, where the guide contours each guide an element associated with one of the moving bodies;

wherein a first of the at least three guide contours is a groove formed in the continuous outer surface and indented toward an interior of the hollow cross section, where the groove is adapted to interact with a guide shoe associated with the moving bodies such that in a first horizontal direction, a relative horizontal movement between the groove and the guide shoe is delimited at least on one side of the guide shoe, and that in a second horizontal direction, perpendicular to the first horizontal direction, a relative horizontal movement between groove and the guide shoe is delimited on two other sides of the guide shoe;

wherein a second of the at least three guide contours is formed as a tongue; and wherein the rail is triangular in cross section.

18. The elevator rail according to claim 17 wherein the rail is right-angled triangular in cross section.

19. The elevator rail according to claim 17 including a third of the at least three guide contours being formed as a tongue, and wherein the second guide contour and the third guide contour lie at corner points of the triangular rail that are furthest apart from one another.

* * * * *